Patented Feb. 26, 1929.

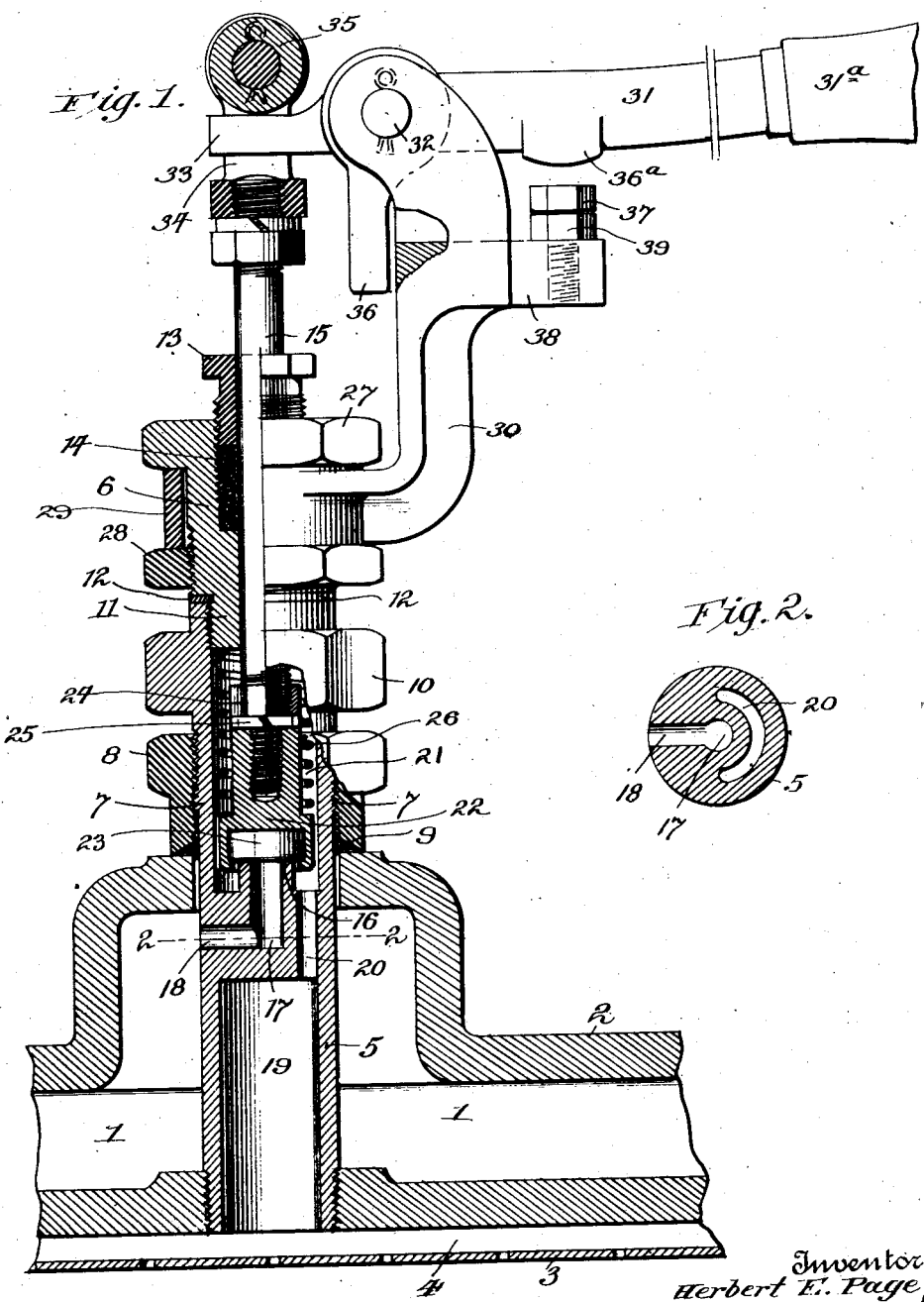

1,703,165

UNITED STATES PATENT OFFICE.

HERBERT EDWARD PAGE, OF SYRACUSE, NEW YORK, ASSIGNOR TO UNITED STATES HOFFMAN MACHINERY CORPORATION, OF NEW YORK, N. Y., A CORPORATION OF DELAWARE.

VALVE.

Application filed July 20, 1926. Serial No. 123,729.

This invention pertains to an improved valve mechanism and has reference more particularly to a valve designed to be employed in connection with garment pressing machines wherein steam is ejected through the face of the pressing element.

The main object of the invention is to provide a valve which may be readily assembled and readily positioned.

A further object of the invention is to provide a structure wherein the valve stem may be repacked without cutting off the steam from the line leading to the head or similar element; in other words, it may be termed a valve with packing on the low pressure side.

A further object of the invention is to provide means whereby the operator cannot, through the manipulation of the actuating lever or handle of the valve in a reverse direction from the normal, place undue pressure upon the valve disk and a still further object is to provide means for limiting the movement of the handle or lever in its opening movement so as to regulate the quantity or volume of steam which may pass through the valve.

The valve structure is shown in the annexed drawing wherein

Figure 1 is a sectional elevation thereof, the same being shown as applied to the steam heated head of a garment pressing machine; and Figure 2 a transverse sectional view taken on the line 2—2 and illustrating the ports or passages formed in that portion of the valve structure adjacent the valve seat.

While the valve is shown in connection with a head or a garment pressing machine, it is to be understood that its use is not limited thereto and it may be employed for controlling the passage of steam from one chamber to another as may be found desirable. In other words, the showing is merely illustrative of one use to which the valve may be put.

In the drawings, 1 denotes a steam chamber formed in the head 2 of a machine, the lower wall of which is shown as provided with a threaded opening into which the valve body, hereinafter described, is screwed. Underlying the lower wall of the head is a perforate plate 3 held in spaced relation to said lower wall and thereby forming a steaming chamber 4.

The valve body may be said to be composed of two parts, a lower portion 5 and an upper portion 6. The lower end of the lower member 5 is provided with a taper thread which is screwed tightly into the opening in the bottom wall of the head, heretofore referred to. Said body element 5 passes freely through an opening formed in the upper wall of the head and is externally threaded as at 7 and a jam nut 8 is mounted on such threaded portion.

A gasket 9 is interposed between the lower face of the nut and the adjacent face of the outer wall so that when said nut is screwed downwardly a steam tight joint is effected at this point. The upper end of the member 5 is formed with a nut-shaped element 10 which enables the lower member 5 to be forcibly screwed into place in order to effect a steam tight joint. The upper end of said member 5 is interiorly threaded and the lower threaded end 11 of the upper member 6 is screwed into said threaded portion, a gasket 12 being interposed between the parts. The upper end of member 6, in turn, is interiorly threaded to receive a packing gland 13 which may be screwed inwardly to compress the packing 14 about the valve stem 15. The lower body element 5 is provided with an annular valve seat 16 and formed in the body is a centrally disposed port or passage 17 which opens centrally of the seat, said passage at its lower end being in communication with a laterally extending passage 18 which opens into the steam chamber of the head. The lower portion of the member 5 is counterbored forming a relatively large chamber 19 and said chamber is in communication with a relatively large passage or port 20, see Figure 2, said port at its upper end opening into an upper chamber 21 formed in the member 5.

As will be seen, the port 20 is of much larger area than the port 18 as well as larger than the port 17, which in effect is a continuation of the port 18.

The chamber 21 is formed in the lower body element 5 by boring out the upper portion thereof, at which time the upstanding seat 16 is likewise formed. Stated in another way, the body 5 may be said to be hollow and provided with a cross diaphragm upon the upper face of which the valve seat proper is formed and through which diaphragm suitable ports or openings for the passage of the steam are formed.

The lower end of the valve stem is threaded and is screwed into a disk holder 22, the lower end of which is hollowed out to receive a disk or washer 23 which is held in place by turning over the edge of the cup or recess in which the disk is seated.

The stem 15 may be held in its position with reference to the disk holder 22 by any suitable means as, for instance, by a locknut 24 and an interposed lockwasher 25. A spring 26 bearing upon the outwardly extending portion of the disk holder and against the lower end of the upper body element 6 tends to force the stem downwardly and to hold the disk 23 against the seat 16 and to thus shut off the flow of fluid through the ports or passages.

The body member 6 is provided at its upper end with a polygonal or nut-shaped member 27 and is externally threaded, adjacent its lower portion, to receive a nut 28. Prior to the placement of the nut in position, the body member is passed through the eye 29 formed upon the lower end of a bracket 30, which bracket forms the support for the operating lever of the valve. Said bracket, at its upper end, is bifurcated to receive the valve operating lever 31 which lever is fulcrumed upon a pin 32 secured in the bifurcated upper portion. The lever is provided with one short arm 33 which passes into the opening formed in a clevis 34, which latter is secured to the upper threaded end of the valve stem 15. The short arm 33 underlies a roller 35 mounted in the upper end of the clevis. This construction provides for easy manipulation of the valve upon depression of the lever 31 when the operator pulls down upon the handle 31ª mounted upon the outer end of the long arm of the lever.

To prevent strain being placed upon the disk 23 by forcing the lever upwardly, said lever is provided with a depending lug or arm 36 which stands adjacent to the upstanding portion of the bracket 30 and contacts the same when the lever is moved counter clock-wise.

To limit the downward movement of the lever 31 and the consequent opening of the valve, which opening of course will regulate the amount of steam which passes through the valve, a stop means is provided for the lever. This, in the instant case, is shown as a lug or enlargement 36ª formed upon the under face of the lever, said lug standing in alignment with a stop screw or bolt 37 threaded into an outwardly projecting lug 38 formed upon the bracket 30. A locking nut 39 is provided for holding the screw or bolt 37 in its adjusted position.

From the foregoing it is thought that the operation of the valve will be clear.

By arranging the ports in the manner above described, that is to say, by making the exhaust port 20 materially larger than the inlet port 17—18, no considerable amount of steam pressure will be present in the chamber 21 and consequently the tendency for steam to leak out past the valve stem is minimized. Furthermore, the valve stem may be repacked without the necessity of cutting off the steam, inasmuch as the spring will hold the valve to its seat and prevent steam from passing upwardly along the stem when the gland 13 is removed with a view to replacing the packing. Again, the valve may be screwed into place without any need for disassembling the same for if one merely backs the nut 28 away from the eye 29 of the bracket 30, the valve as a whole may be screwed to place while the bracket and lever remain at rest, the stem, of course, at such time likewise remaining at rest by reason of the engagement of the short arm 33 with the clevis 34. At such time it may be desirable to raise the valve from its seat in order to prevent grinding action upon the disk.

Having thus described my invention, what I claim is:

1. In a valve the combination of a body; a valve seat formed therein; a valve stem mounted for endwise movement in the body toward and from the seat; a valve disk movable with the stem; a bracket extending upward from the upper end of the body; an operating lever fulcrumed in the upper end of the bracket with one end thereof overlying the upper end of the stem; and a roller secured to the stem and overlying the adjacent end of the lever.

2. In a valve the combination of a body; a valve seat formed therein; a valve stem mounted for endwise movement in the body toward and from the seat; a valve disk movable with the stem; a bracket extending upward from the upper end of the body; an operating lever fulcrumed in the upper end of the bracket; a clevis secured to the upper end of the stem; and a roller carried by the clevis, said roller overlying the short end of the lever which extends through the clevis.

3. In a valve the combination of a body; a valve seat formed therein; a valve stem mounted for endwise movement in the body toward and from the seat; a valve disk movable with the stem; a bracket supported by and extending upwardly from the body; an operating lever fulcrumed in the upper end of the bracket; connections between said lever and the valve stem; and a stop lug extending downwardly from the lever and arranged to contact the bracket, said lug serving to prevent undue movement of the lever in that direction which would impose undue pressure upon the disk.

4. A valve as set forth in claim 3 wherein means is provided for limiting the valve opening movement of the lever.

5. A valve as set forth in claim 3 wherein an adjustable stop is provided on the bracket to contact and limit the valve opening movement of the lever.

6. In a valve the combination with a hollow body portion; a diaphragm therein having inlet and exhaust ports formed therein, the latter being of materially greater area than that of the inlet; a valve seat formed around the latter; a valve stem; a disk associated therewith; and means for actuating the stem.

7. In a valve the combination with a hollow body portion; a diaphragm therein; a valve seat formed on the upper face of the diaphragm; an inlet port extending from the exterior of the body through the diaphragm and terminating within the seat; a discharge port of materially larger area extending through the diaphragm and terminating within the hollow body portion; a valve stem; a disk for closing the inlet port associated with the stem; a closure for the upper end of the hollow body portion and through which the stem passes; a packing gland carried by the closure; and means for actuating the stem.

8. In a valve the combination of a hollow valve body; a valve seat located therein and controlling an inlet port, said body likewise having an exhaust port of relatively larger area than that of the inlet port, said discharge port opening adjacent the valve seat at one end and at its opposite end into the lower hollow portion of the body; a valve stem extending upwardly through the hollow body; a closure for the upper end of the hollow body and through which the valve stem extends and a packing gland mounted in said closure and functioning to produce a tight joint around the stem.

In testimony whereof I have signed my name to this specification.

HERBERT EDWARD PAGE.